(12) United States Patent
Harmon

(10) Patent No.: US 11,711,998 B2
(45) Date of Patent: Aug. 1, 2023

(54) INTEGRATED COMMODITY FLOW DETECTION

(71) Applicant: DEERE & COMPANY, Moline, IL (US)

(72) Inventor: Andrew W. Harmon, Davenport, IA (US)

(73) Assignee: DEERE & COMPANY, Moline, IL (US)

( * ) Notice: Subject to any disclaimer, the term of this patent is extended or adjusted under 35 U.S.C. 154(b) by 255 days.

(21) Appl. No.: 16/910,760

(22) Filed: Jun. 24, 2020

(65) Prior Publication Data

US 2021/0127560 A1 May 6, 2021

Related U.S. Application Data

(60) Provisional application No. 62/928,577, filed on Oct. 31, 2019.

(51) Int. Cl.
| | | |
|---|---|---|
| *A01C 7/08* | (2006.01) | |
| *A01C 7/10* | (2006.01) | |
| *B65G 53/08* | (2006.01) | |
| *B65G 53/40* | (2006.01) | |
| *B65G 53/56* | (2006.01) | |
| *B65G 53/66* | (2006.01) | |

(52) U.S. Cl.
CPC .............. *A01C 7/105* (2013.01); *A01C 7/081* (2013.01); *B65G 53/08* (2013.01); *B65G 53/40* (2013.01); *B65G 53/56* (2013.01); *B65G 53/66* (2013.01); *B65G 2201/0202* (2013.01); *B65G 2201/047* (2013.01); *B65G 2203/0208* (2013.01); *B65G 2203/042* (2013.01); *B65G 2812/1625* (2013.01)

(58) Field of Classification Search
None
See application file for complete search history.

(56) References Cited

U.S. PATENT DOCUMENTS

| | | | | |
|---|---|---|---|---|
| 2,128,671 A * | 8/1938 | Drenkard, Jr. | ......... | B65G 51/40 406/6 |
| 4,779,765 A | 10/1988 | Neumeyer | | |

(Continued)

FOREIGN PATENT DOCUMENTS

| | | | | |
|---|---|---|---|---|
| AU | 2016222382 A1 * | 4/2017 | ............. | A01C 5/062 |
| CA | 2248436 A1 | 3/2000 | | |
| EP | 3150041 A1 | 4/2017 | | |

OTHER PUBLICATIONS

Extended European Search Report and Written Opinion issued in European Patent Application No. 20202197.8, dated Mar. 24, 2021, in 11 pages.

(Continued)

*Primary Examiner* — Joseph A Dillon, Jr.
(74) *Attorney, Agent, or Firm* — Taft Stettinius & Hollister LLP; Stephen F. Rost

(57) ABSTRACT

An air seeder assembly that has a tank for containing commodity, a meter assembly coupled to the tank and configured to selectively distribute commodity there through, a first conduit coupled to the meter assembly to direct commodity provided to the first conduit from the meter assembly to a tool assembly, a diverter that selectively diverts commodity to the first conduit, and a sensor coupled to the diverter to identify when commodity is passing thereby.

17 Claims, 8 Drawing Sheets

(56) References Cited

U.S. PATENT DOCUMENTS

| | | | | |
|---|---|---|---|---|
| 4,989,784 | A * | 2/1991 | Fairchild | A01C 7/084 239/114 |
| 6,709,203 | B2 * | 3/2004 | McKinnis | B07C 5/362 406/182 |
| 8,051,877 | B2 * | 11/2011 | Lichney | B65G 53/56 406/151 |
| 9,108,808 | B2 * | 8/2015 | Furuyama | B01D 53/12 |
| 9,944,473 | B2 * | 4/2018 | Bent | A01C 14/00 |
| 9,999,174 | B2 * | 6/2018 | Funck | A01C 7/04 |
| 10,451,464 | B1 * | 10/2019 | Champaigne | F16K 31/10 |
| 11,445,658 | B2 * | 9/2022 | Garner | A01C 7/105 |
| 2004/0069692 | A1 * | 4/2004 | Wooldridge | B07C 5/38 209/655 |
| 2009/0304461 | A1 * | 12/2009 | Strohschein | B65G 53/521 406/93 |
| 2012/0174844 | A1 | 7/2012 | Friggstad | |
| 2014/0049395 | A1 * | 2/2014 | Hui | A01C 7/081 340/3.43 |
| 2016/0037713 | A1 | 2/2016 | Wendte et al. | |
| 2016/0246296 | A1 | 8/2016 | Gelinske et al. | |
| 2020/0245529 | A1 * | 8/2020 | Thompson | A01C 7/102 |
| 2021/0112698 | A1 * | 4/2021 | Ekhe | A01C 7/102 |
| 2021/0127566 | A1 * | 5/2021 | Harmon | A01C 15/007 |
| 2022/0030761 | A1 * | 2/2022 | Harmon | A01C 7/208 |
| 2022/0232754 | A1 * | 7/2022 | Harmon | A01C 7/081 |

OTHER PUBLICATIONS

Vaderstad Fenix III seed meter, https://www.vaderstad.com/en/products/fenix-iii/, available at least as early as Oct. 17, 2018.
Kverneland Brochure; "The Inventors of Pneumatic Seeding Technology"; 2017; 28 pages.
Amity Technology; "Owners Operating Manual 3800/5250 Air Cart"; Oct. 31, 2017, 55 pages.

* cited by examiner

INTEGRATED COMMODITY FLOW DETECTION

CROSS-REFERENCE TO RELATED APPLICATION

The present application claims the benefit of U.S. Provisional Application No. 62/928,577 filed on Oct. 31, 2019, the contents of which are hereby incorporated herein in entirety.

FIELD OF THE DISCLOSURE

The present disclosure relates generally to identifying the flow of commodity through a meter assembly and more specifically to identifying commodity flow by coupling a sensor to a commodity diverter.

BACKGROUND

Modern air seeders utilize airflow through conduit to direct commodity such as fertilizer and seed to a desired location. Typically, the commodity is stored in a tank on a cart and selectively provided to conduit to be further transported to a drill assembly or otherwise ultimately placed in the underlying soil. A meter assembly is often positioned between the tank and the conduit to selectively distribute commodity from the tank into the conduit.

SUMMARY

One embodiment is an air seeder assembly that has a tank for containing commodity, a meter assembly coupled to the tank and configured to selectively distribute commodity there through, a first conduit coupled to the meter assembly to direct commodity provided to the first conduit from the meter assembly to a tool assembly, a diverter that selectively diverts commodity to the first conduit, and a sensor coupled to the diverter to identify when commodity is passing thereby.

One example of this embodiment has a second conduit coupled to the meter assembly to direct commodity provided to the second conduit from the meter assembly to the tool assembly. In one aspect of this example the diverter is a flapper that has a first position that directs commodity towards the first conduit and as second position that directs commodity towards the second conduit. In part of this aspect, the sensor is positioned in the flapper. Further, the flapper has a non-planar surface profile on a first side and a second side.

In another example of this embodiment, the sensor is positioned inside a cavity of the diverter. In yet another example, the diverter is a flapper pivotable about a flapper axis and the sensor is positioned within the flapper. In one aspect of this example, the sensor has at least one wire configured to communicate a sensor reading and the at least one wire exits the flapper along the flapper axis.

Another embodiment is a meter assembly that has a housing defining an inlet configured to be coupled to a tank, a metering device coupled to the housing to meter flow of commodity from the inlet, a diverter positioned at an outlet of the housing to selectively distribute commodity to at least one conduit, a sensor coupled to the diverter to identify when commodity is flowing thereby.

In one example of this embodiment, the diverter is a flapper pivotally coupled to the housing about a flapper axis and positionable between a first position and a second position. In one aspect of this example, the flapper is formed of a first side and a second side coupled to one another and the sensor is coupled between the first side and the second side. In yet another aspect of this example, the sensor has at least one wire configured to communicate a sensor reading and the at least one wire exits the flapper along the flapper axis. In another aspect of this example, the flapper has at least one non-planar surface profile configured to intermingle commodity that contacts the non-planar surface.

Yet another example of this embodiment has a second sensor coupled to the diverter. In one aspect of this example the sensor is coupled to a first surface of the diverter and the second sensor is coupled to a second surface of the diverter, wherein the first surface is in a commodity flow path when the diverter is in a first position and the second surface is in the commodity flow path when the diverter is in a second position. In yet another example the sensor is a piezoelectric sensor that identifies the impact of commodity against the diverter.

Yet another embodiment is a method for identifying a blockage of commodity in a meter assembly. The method includes providing a housing, a metering device, a diverter, at least one conduit, a sensor, and a controller, coupling the metering device to the housing to meter flow of commodity from an inlet to an outlet of the meter assembly, positioning the diverter at the outlet of the meter assembly to selectively distribute commodity to the at least one conduit, and coupling the sensor to the diverter to communicate to the controller when commodity is flowing thereby.

One example of this embodiment includes identifying with the controller when a blockage occurs by monitoring when the metering device is moving commodity and the sensor is not identifying flowing commodity. One aspect of this example includes providing an indication when the controller identifies a blockage. As part of this aspect the indication is an icon displayed on a user interface.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

Figure 1:
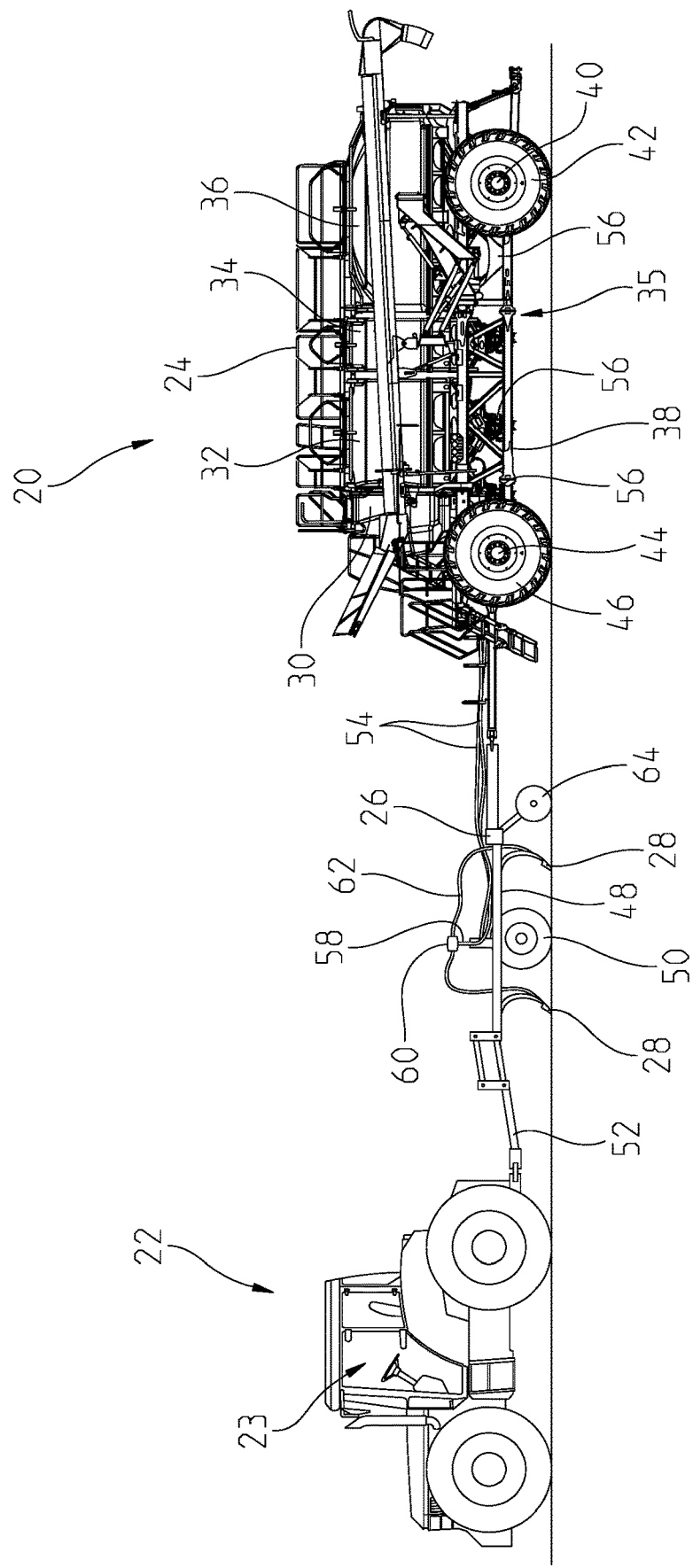
FIG. 1 is a side view of a towed cart and prime mover along with an attached implement.

For the purposes of promoting an understanding of the principles of the present disclosure, reference will now be made to the embodiments described herein and illustrated in the drawings and specific language will be used to describe the same. It will nevertheless be understood that no limitation of the scope of the present disclosure is thereby intended, such alterations and further modifications in the illustrated devices and methods, and such further applications of the principles of the present disclosure as illustrated therein being contemplated as would normally occur to one skilled in the art to which the present disclosure relates.

An air or pneumatic seeder 20 is shown in FIG. 1 towed by a tractor or prime mover 22. The seeder 20 includes an air cart 24, also known as a commodity cart, having one or more tanks for one or more commodities to be applied to the soil, and a drill or implement 26 which applies the commodity to the soil. The drill has a plurality of ground engaging tools 28. The cart 24 is shown with four tanks 30, 32, 34, and 36 mounted on a frame 38. The frame 38 is supported on a rear axle 40 having wheels/tires 42 at the rear of the frame 38. Depending on the cart configuration, additional axles may be provided, such as front axle 44 and wheels/tires 46. The axles and wheels support the cart frame 38 for movement over the ground surface towed by tractor 22. Any number of tanks can be provided on the air cart. The term "cart" should be broadly construed to include any device towed by a prime mover that is supported on one or more axles, such as a trailer, wagon, cart, implement, etc.

The drill 26 includes a frame 48 supported by ground wheels 50 and is connected to the rear of the tractor 22 by a tongue 52. As shown, the cart 24 is known as a "tow behind" cart meaning that the cart follows the drill. In alternative arrangements, the cart may be a "tow between" cart meaning that the cart is between the tractor 22 and drill 26. In yet a further possible arrangement, the air cart and drill can be combined onto a common frame. The tanks 30, 32, 34, and 36 can be any suitable device for holding a material or commodity such as seed or fertilizer to be distributed to the soil. The tanks could be hoppers, bins, boxes, containers, etc. The term "tank" shall be broadly construed herein. Furthermore, one tank with multiple compartments can also be provided.

A pneumatic distribution system 35 includes a fan located behind the front tires 46, connected to a product delivery conduit structure having multiple product flow passages 54. The fan directs air through the passages 54. A product meter assembly 56 is located at the bottom of each tank and delivers product from the tanks at a controlled rate to the passages 54 and the air stream moving through the passages 54.

Each passage 54 carries product in the air stream to a secondary distribution tower 58 on the drill 26. Typically, there will be one tower 58 for each passage 54. Each tower 58 includes a secondary distributing manifold 60 located at the top of a vertical tube. The distributing manifold 60 divides the flow of product into a number of secondary distribution lines 62. Each secondary distribution line 62 delivers product to one of a plurality of ground engaging tools 28 which opens a furrow in the soil and deposits the product therein. The number of passages 54 may vary from one to eight or ten or more, depending on the configuration of the cart and drill. Depending on the cart and drill, there may be two distribution manifolds in the air stream between the meters and the ground engaging tools. Alternatively, in some configurations, the product is metered directly from the tank into secondary distribution lines 62 leading to the ground engaging tools 28 without an intermediate distribution manifold.

A firming or closing wheel 64 associated with each tool 28 trails the tool and firms the soil over the product deposited in the soil. Various types of tools 28 may be used including, tines, shanks, disks, etc. The tools 28 are movable between a lowered position engaging the ground and a raised position above the ground. Each tool may be configured to be raised by a separate actuator. Alternatively, multiple tools 28 may be mounted to a common rockshaft for movement together. In yet another alternative, the tools 28 may be fixed to the frame 38 and the frame 38 raised and lowered by linkages on each of the drill wheels 50.

Figure 2:
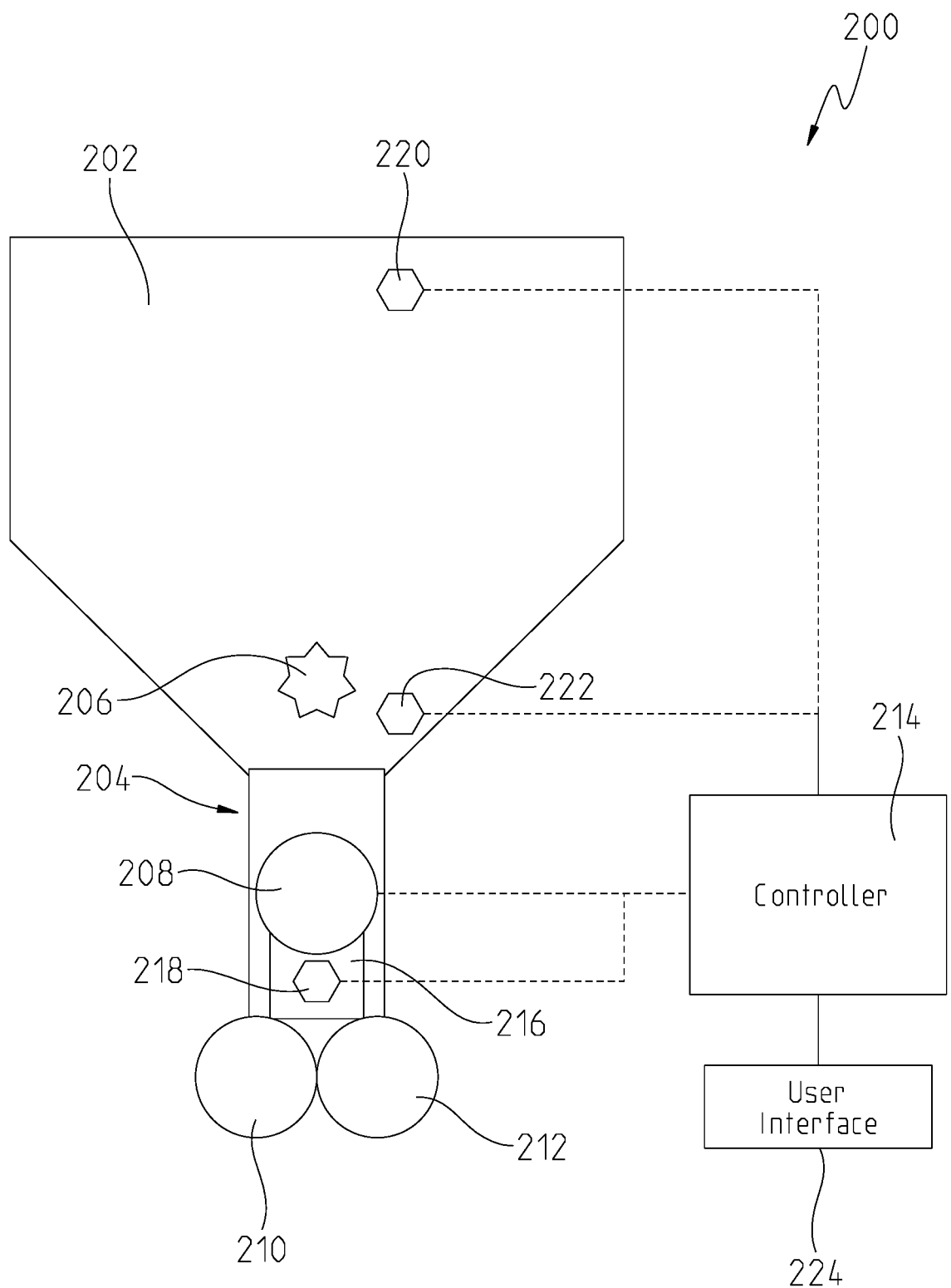
FIG. 2 is a schematic view of a meter assembly.

Referring now to the non-exclusive embodiment of FIG. 2, a schematic view of a system 200 for metering commodity is illustrated. The system 200 may have a tank 202 that is configured to hold commodity therein. The tank 202 may be any of the tanks 30, 32, 34, and 36 discussed herein. More specifically, the tank 202 may be any type of container capable of holding commodity and directing commodity to a meter assembly 204. In one aspect of this disclosure, the tank 202 may have an agitator 206 positioned therein to agitate commodity to facilitate flow into the meter assembly 204.

The meter assembly 204 may be the meter assembly 56 or any assembly capable of selectively metering commodity flow there through. In one non-exclusive example, the meter assembly 204 may have a metering device 208 positioned therein. The metering device 208 may selectively transfer commodity from the tank 202 to one or more conduit 210, 212. In one aspect of this disclosure, the metering device 208 may be selectively engaged by a controller 214 to selectively control when commodity is being processed through the meter assembly 204 along with how much commodity is being processed there through. As one non-exclusive example, the metering device 208 may be a roller that is selectively rotated via the controller 214 at a variable speed. The controller 214 may selectively rotate the roller at a speed that corresponds with a desired distribution rate for the commodity. In other words, the controller 214 may meter the distribution of commodity through the meter assembly 204 by selecting the rotation speed of the metering device 208.

While a roller is discussed herein for the metering device 208, any assembly capable of metering the flow of commodity through the meter assembly 204 is considered for the metering device 208. In another embodiment, the metering device 208 may utilize an auger assembly to meter commodity flow. Accordingly, this disclosure contemplates many different configurations for the metering device and the roller is meant as one non-exclusive example.

In one aspect of this disclosure, a diverter 216 may be positioned between the metering device 208 and the conduit 210, 212 to selectively distribute commodity to one of the first conduit 210 or the second conduit 212. More specifically, the diverter 216 may be a rotary or flapper style diverter, among other types, that selectively directs commodity to flow into a passageway of the first or second conduit 210, 212. Further, the diverter 216 may substantially prevent the unselected conduit 210, 212 from receiving commodity.

Regardless of the type of diverter 216, a sensor 218 may be coupled to the diverter 216 to identify when commodity is passing by the diverter 216. More specifically, the diverter 216 may contact the commodity flowing there through to direct the commodity towards the desired conduit 210, 212. The sensor 218 may be positioned in, or coupled to, the diverter 216 to identify vibrational inputs caused by the contact between the diverter 216 and the commodity as it flows there through. The sensor 218 may communicate sensor readings to the controller 214 to be further processed by the controller 214 to identify when commodity is flowing through the diverter 216. The sensor 218 may be any type of sensor capable of identifying commodity flow there through. However, in one non-exclusive embodiment the sensor 218 is a piezoelectric sensor that identifies vibrational contact between the commodity and the diverter 216 as commodity bounces off or otherwise contacts the diverter 216.

Figure 3A:
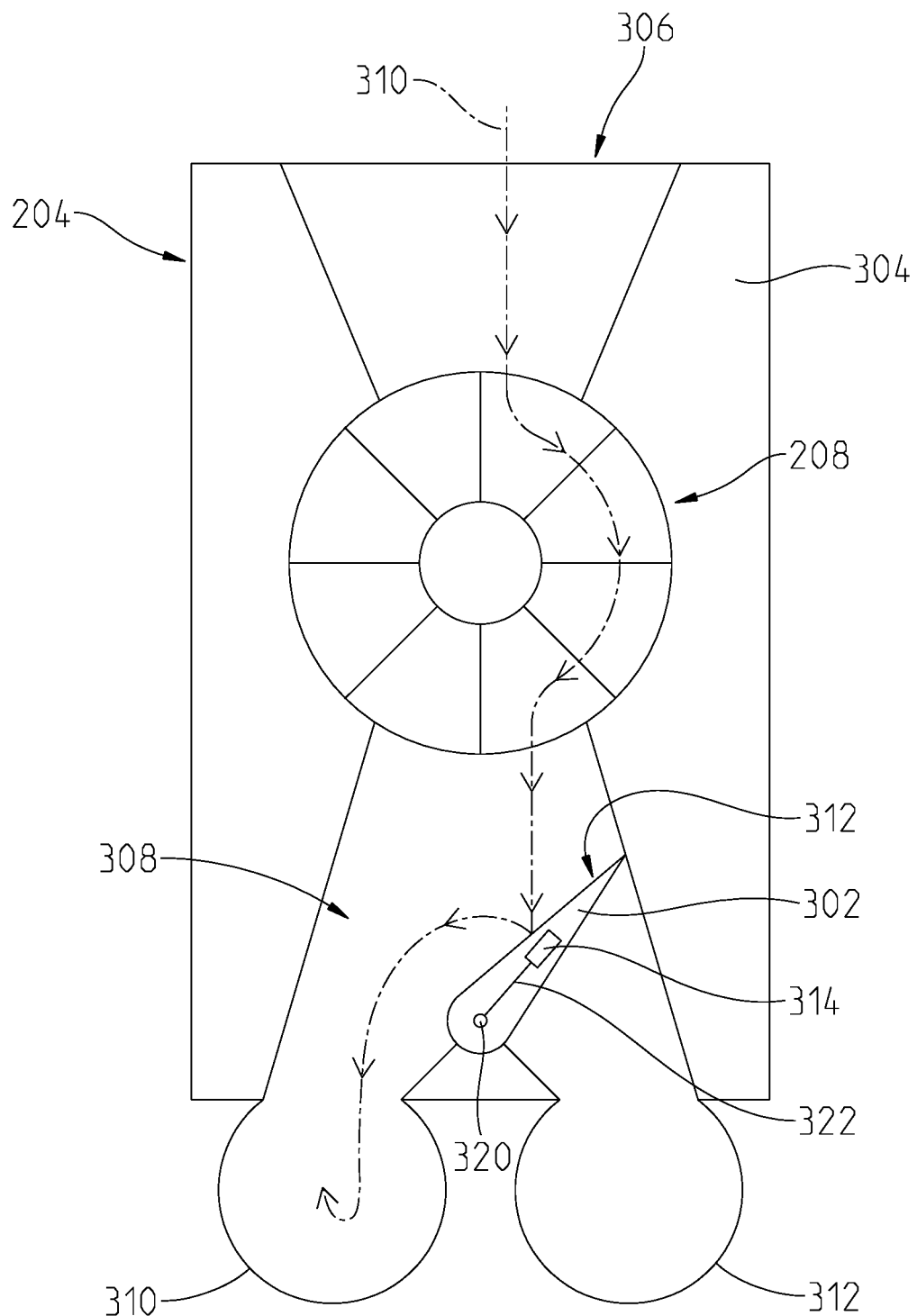
FIG. 3a is a schematic section view of a meter assembly in a first position.
Figure 3B:
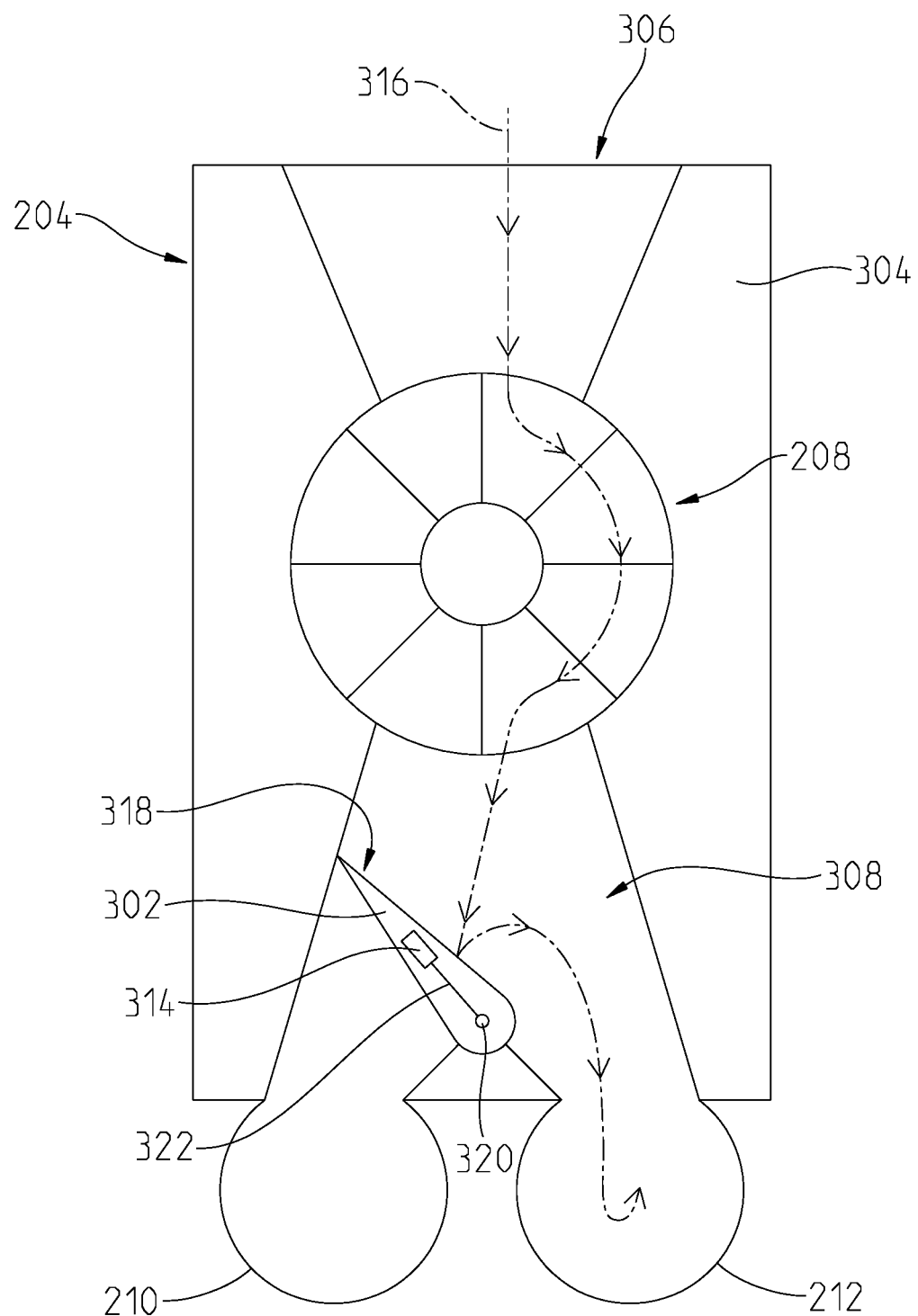
FIG. 3b is a schematic section view of the meter assembly of FIG. 3a in a second position.

Referring now to FIGS. 3*a* and 3*b*, a section view of one embodiment of the meter assembly 204 is illustrated. In the embodiment of FIGS. 3*a* and 3*b*, the diverter 216 utilizes a flapper 302 to divert commodity into conduit 210, 212. However, this disclosure also considers implementing the teachings discussed herein with any known method of diverting commodity flow in a meter assembly.

FIG. 3*a* illustrates the meter assembly 204 in a first position wherein commodity processed by the metering device 208 passes through a housing 304 and into the first conduit 210. Commodity may enter the housing 304 along an inlet 306. The inlet 306 may be coupled to the tank 202 to provide commodity thereto. Commodity positioned along the inlet may be selectively distributed to an outlet 308 by the metering device 208. In the embodiment illustrated in FIGS. 3*a* and 3*b*, the metering device 208 may be a roller having a plurality of cavities formed there around. The plurality of cavities may receive commodity therein from the inlet 306 as the roller selectively rotates about an axis. As the cavities become positioned along the outlet 308, any commodity therein may fall or otherwise exit the cavity to be further processed in the outlet 308.

In one non-exclusive example, a first flow path 310 is illustrated in FIG. 3*a*. The first flow path 310 may be the flow path of commodity when commodity is present in the inlet 306 and the metering device 208 is providing commodity flow there through. In the example of the roller, the flow path 310 is one example of the commodity path when the roller is rotating. As the flow path 310 exits the metering device 208 into the outlet 308, at least some of the commodity will contact a first surface 312 of the flapper 302. In the first position of FIG. 3*a*, the flapper 302 may substantially block commodity from flowing into the second conduit 212 and direct commodity to flow into the first conduit 210. In this configuration, the first flow path 310 may direct at least some commodity to contact the first surface 312 and be redirected towards the first conduit 310.

In the embodiment of FIGS. 3*a* and 3*b*, the sensor 218 may be a sensor 314 positioned in the flapper 302. As illustrated in FIG. 3*a*, the first flow path 310 directs at least some commodity flow to contact the flapper 302. By positioning the sensor 314 in or on the flapper 302, the controller 214 may identify when commodity is being directed into the first conduit 210 by identifying commodity contact against the flapper 302.

FIG. 3*b* illustrates the meter assembly 204 in a second position wherein commodity processed by the metering device 208 passes through the housing 304 and into the second conduit 212. In FIG. 3*b*, a second flow path 316 is illustrated. The second flow path 316 may be representative of the flow path of commodity when commodity is present in the inlet 306 and the metering device 208 is providing commodity flow there through. In the example of the roller, the flow path 316 is one example of the commodity path when the roller is rotating. As the flow path 316 exits the metering device 208 into the outlet 308, at least some of the commodity will contact a second surface 318 of the flapper 302. In the second position of FIG. 3*b*, the flapper 302 may substantially block commodity from flowing into the first conduit 210 and direct commodity to flow into the second conduit 212. In this configuration, the second flow path 316 may direct at least some commodity to contact the second surface 318 and be redirected towards the second conduit 312.

In one non-exclusive example, the flapper 302 may pivot between the first position and the second position about a flapper axis 320. Further, the sensor 314 may have a wire or wires 322 that electrically couple the sensor 314 to the controller 214 to communicate the sensor 314 readings thereto. The wire 322 may exit the flapper 302 and by routed into the housing 304 along the flapper axis 320. In this configuration, the wire 322 may experience only minimal deformation as the flapper 302 is repositioned between the first position and the second position.

Figure 4A:
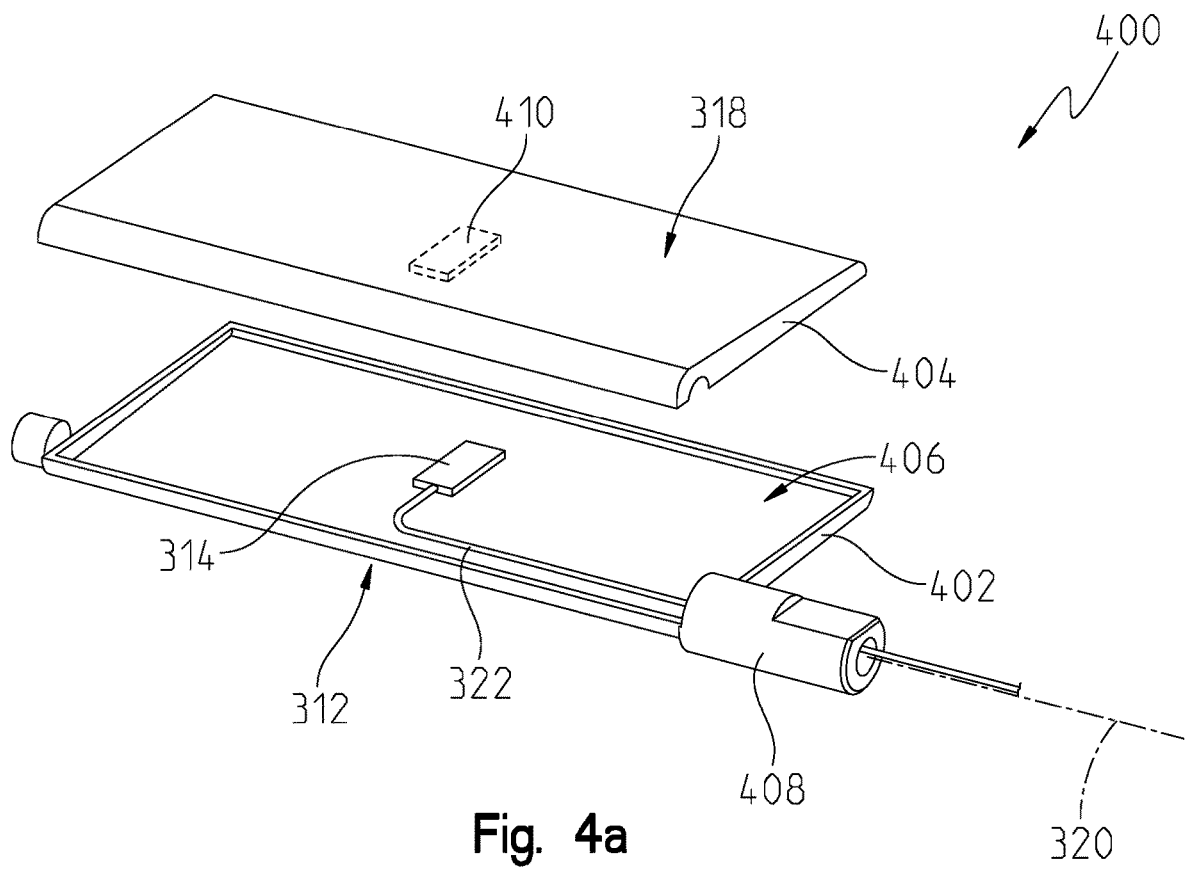
FIG. 4a is an expanded view of a flapper assembly.

Referring now to FIG. 4*a*, one embodiment of a flapper assembly 400 is illustrated. The flapper assembly 400 may have a first side 402 and a second side 404 that can be coupled to one another to form the flapper 302. The first side 402 may provide the first surface 312 and the second side 404 may provide the second surface 318. Further, a cavity 406 may be formed between the two sides 402, 404. The sensor 314 may be positioned within the cavity 406 to identify vibrational inputs caused by commodity contacting ether the first surface 312 or the second surface 318 of the flapper assembly 400.

The flapper assembly 400 may also define an axial passage through a pivot member 408. The axial passage may be sized to allow the wire 314 to be routed out of the flapper assembly 400 along the flapper axis 320 as discussed herein. Further, the pivot member 408 may provide a location to selectively control the orientation of the flapper assembly 400 along the flapper axis 320.

Figure 4B:
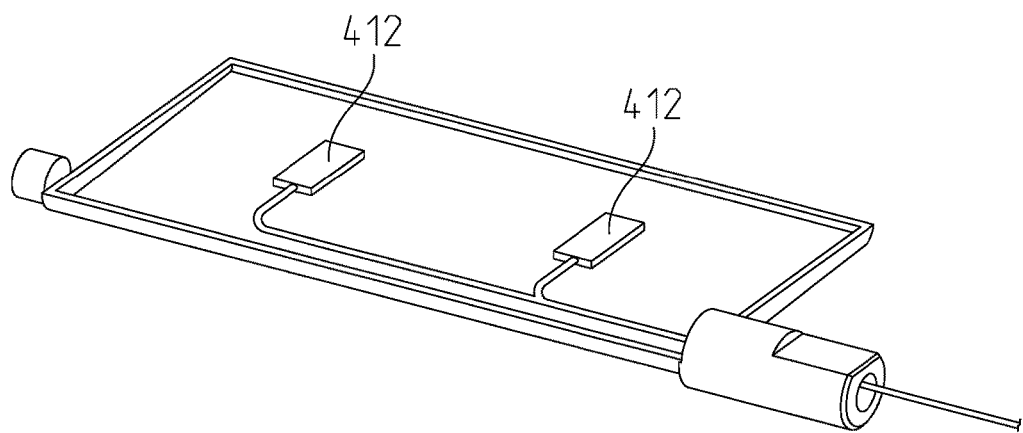
FIG. 4b is an elevated perspective view of another embodiment of a partial flapper assembly.

In another aspect of this disclosure, the sensor 314 may be coupled directly to the first side 402 and a second sensor 410 may be coupled directly to the second side 404. In this configuration, each sensor 314, 410 may be monitored by the controller 214 to identify commodity contact on the corresponding surface 312, 318. In yet another embodiment illustrated in FIG. 4*b*, multiple sensors 412 may be coupled to one or both sides 402, 404 to provide further resolution to the controller 214 regarding when and where commodity is contacting the flapper assembly 400. Accordingly, this disclosure contemplates positioning one sensor in the flapper assembly 400 to identify commodity contact on either surface 312, 318 as well as coupling a separate sensor to each side 402, 404 to identify commodity contact on the corresponding side. Further still, this disclosure contemplates coupling multiple sensors to each side to more precisely identify the intensity and position of commodity contact on the corresponding surface 312, 318 of the flapper assembly 400.

Referring now to FIGS. 5*a*-5*k*, several embodiments of a non-planar surface profile for the first and second surfaces 312, 318 are illustrated. In one aspect of this disclosure, commodity may be unevenly dispersed from the metering device 208 into the outlet 308. More specifically, when the metering device 208 is the roller having cavities as discussed herein, the roller may disperse commodity into the outlet 308 in a cyclic fashion. In other words, the introduction of commodity into the outlet 308 may not be uniform but rather be a series of high volume commodity transfers cyclically distributed as cavities pass thereby. The cyclic distribution of commodity is then at least partially redirected by the flapper 302 through contact with either the first surface 312 or the second surface 318 into the corresponding conduit 210, 212. This cyclic introduction of commodity into the conduit 210, 212 may cause inconsistent distribution of commodity at the tool among other things.

Figure 5A:
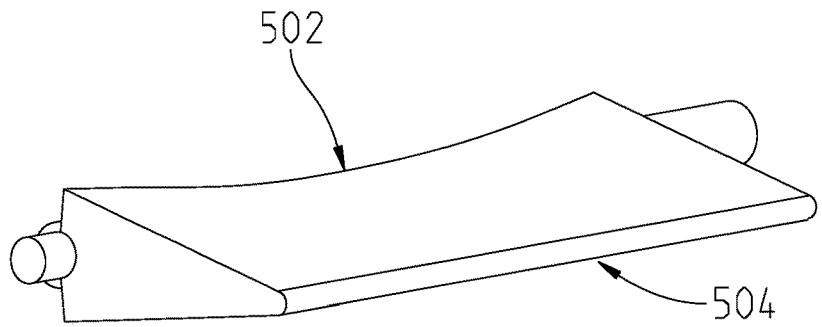
FIGS. 5a-5k are views of different embodiments for a flapper assembly surface.
Figure 5B:
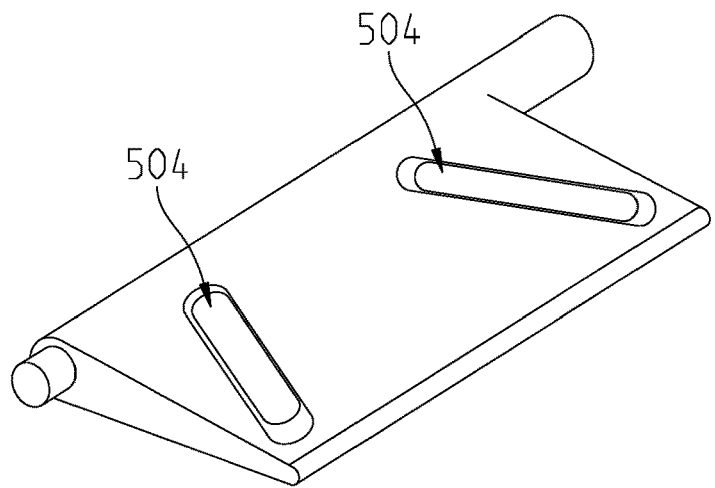
Figure 5C:
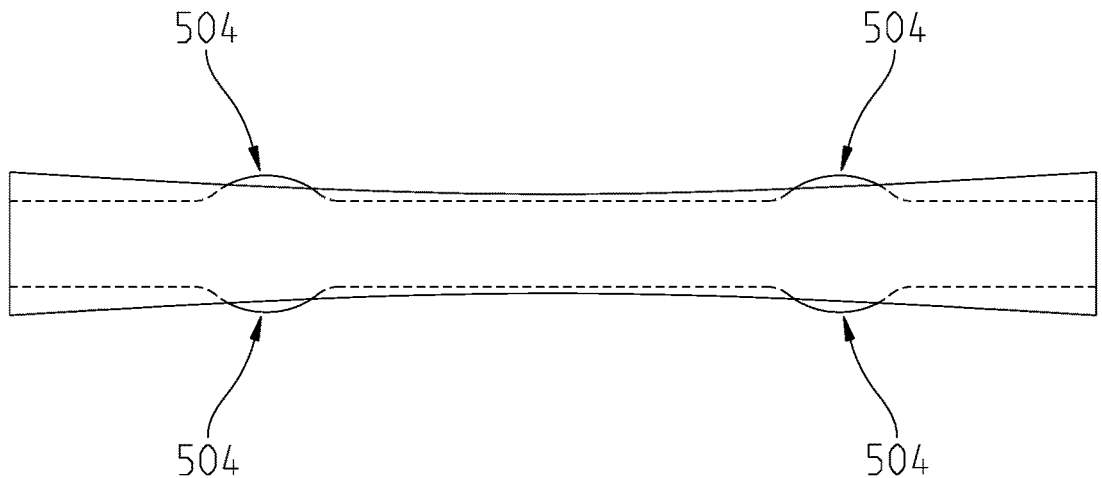
Figure 5G:
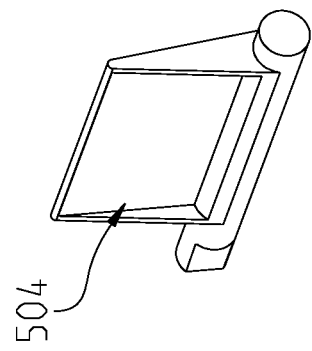
Figure 5F:
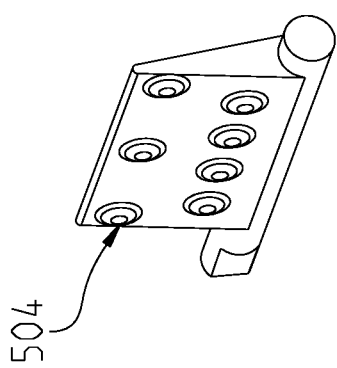
Figure 5E:
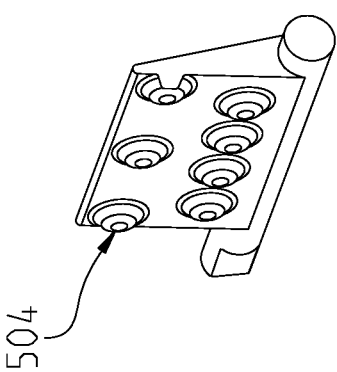
Figure 5D:
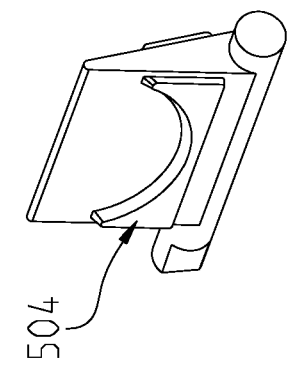
Figure 5K:
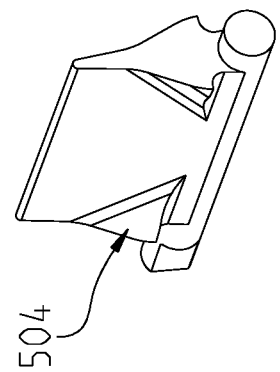
Figure 5J:
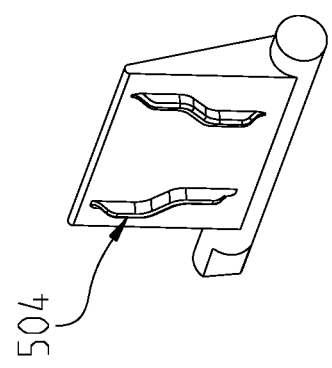
Figure 5I:
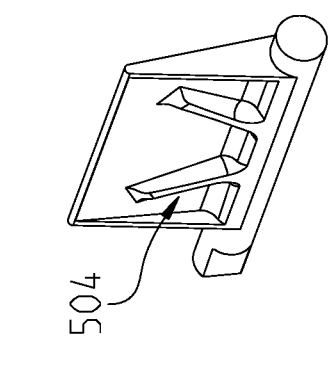
Figure 5H:
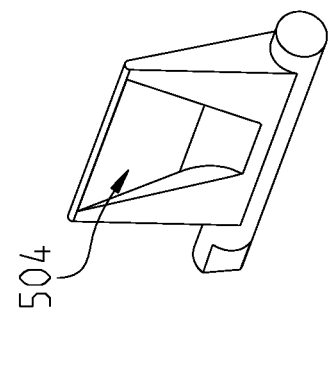

To address at least this issue among others, the embodiments of FIGS. 5a-5k illustrate configurations of the flapper 302 wherein the first and second surface 312, 318 are non-planar and configured to intermingle commodity to provide a consistent, less cyclic introduction of commodity into the corresponding conduit 210, 212. This may be achieved by providing non-planar features on the surfaces 312, 318 to cause the commodity to be redirected by the corresponding surface 312, 318 in different directions. In the embodiment of FIG. 5a, curved surfaces 502 may redirect commodity in different directions depending on where the commodity contacts the surface 502. By redirecting the commodity in different directions, the commodity may intermingle prior to entering the conduit 210, 212 to thereby provide a more consistent and less cyclic flow thereto.

Each flapper from the embodiments illustrated in FIGS. 5a-5k may have a different non-planar surface profile 504 on one or both of the first and second surface 312, 318. Further, each flapper 302 of FIGS. 5a-5k may have one or more sensor 314 positioned therein as described throughout this disclosure. Accordingly, the flappers 302 of FIGS. 5a-5k may have a non-planar surface profile 504 to provide a consistent flow of commodity to the corresponding conduit 210, 212 and one or more sensor 314 positioned within the flapper 302 to identify to the controller 214 when conduit is passing thereby.

Figure 6:
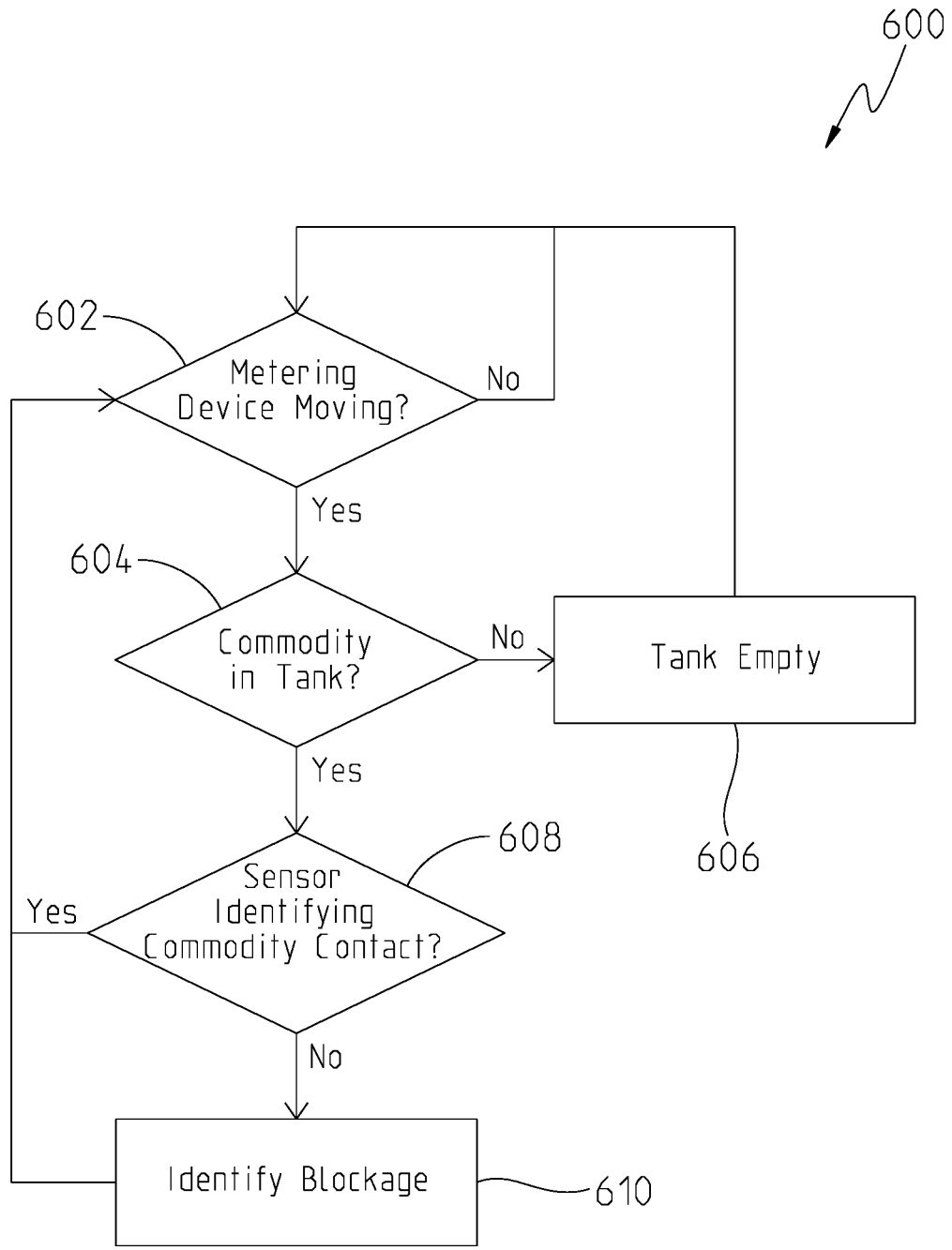
FIG. 6 is a logic flowchart of one embodiment of this disclosure.

Referring now to FIG. 6, one non-exclusive example of a logic control system 600 is illustrated. The logic control system 600 may be implemented entirely by the controller 214 or only in part by the controller 214. Further, in other embodiments a different controller or set of controllers may be dedicated to implementing the logic control system 600 discussed herein. Accordingly, while the controller 214 will be discussed herein as implementing the boxes of the logic control system 600, any capable controller is also considered for executing the boxes discussed with reference to FIG. 6.

Initially in box 602, the controller 214 may identify whether the metering device 208 is engaged. If the metering device 208 is not engaged in box 208, the controller 214 may continue to monitor the metering device in box 602. In one aspect of this disclosure, a motor or the like may power the metering device 208. Further, the controller 214 may monitor the state of the motor in box 602 and determine whether the motor is engaged to power the metering device 208. However, the controller 214 may also monitor any other sensor or system in box 602 that may indicate whether the metering device 208 is activated.

If the controller 214 determines that the metering device 208 is moving in box 602, the controller 604 may check whether there is any commodity in the tank 202 in box 604. More specifically, the controller 214 may communicate with a tank fill height sensor 220 or a tank load sensor 222 to determine whether the tank 202 has commodity therein. The tank fill height sensor 220 may be an ultrasonic or the like sensor capable of identifying the level of commodity in the tank 202. Similarly, the tank load sensor 222 may be a load sensor or the like able to identify the weight of any commodity in the tank 202. Accordingly, this disclosure contemplates monitoring any type of sensor with the controller 214 in box 604 that is capable of identifying the presence of commodity in the tank 202.

If commodity is not identified in the tank 202 by the controller 214 in box 604 the controller 214 may determine that the tank is empty in box 606. If the tank 202 is determined to be empty, the controller 214 may not need to monitor the sensor 314 for commodity contact since commodity cannot be passing through the meter assembly 204. Accordingly, in box 606 the controller 214 may utilize a user interface 224 or the like to identify that the tank 202 is empty and return to box 602. The user interface 224 may be any device capable of communicating to a user the status of the tank 202. More specifically, the user interface 224 may be any device that provides a visual, audio, tactile, or the like signal indicating that the tank 202 is empty.

If commodity is identified in the tank 202 in box 604, the controller 214 may monitor the sensor 218 to determine if commodity is contacting the diverter 216 in box 608. As discussed herein, the diverter 216 may be at least partially in a flow path of commodity wherein when commodity is properly flowing from the tank 202 to the corresponding conduit 210, 212, at least some of the commodity is contacting the diverter 216 as it is redirected. Further, the sensor 218 may be any type of sensor that can identify the contact between the commodity and the diverter 216 to thereby provide an indication to the controller 214 when commodity is flowing there through. Accordingly, in box 608 the controller 214 may be monitoring the sensor 218 to identify when commodity is being redirected by the diverter 216 thereby indicating proper commodity flow.

If the controller 214 does identify that commodity is contacting the diverter 216 in box 608, the controller 214 may determine that the meter assembly 204 is operating as expected and properly flowing commodity there through. Accordingly, the controller 214 may return to box 602 and continue to implement the logic control system 600. However, if commodity is not being redirected by the diverter in box 608, the controller 214 may determine that there is a blockage in box 610. More specifically, if commodity is not properly flowing into the corresponding conduit 210, 212, a buildup of commodity may form in the outlet 308. The buildup of commodity in the outlet 308 may prevent commodity from being redirected by the diverter 216 as it flows thereby. In one non-exclusive example, the buildup of commodity may create a buffer of stagnate commodity positioned along the diverter 216 and preventing the metering device 208 from processing commodity through the meter assembly 204. In this scenario, the sensor 218 does not identify commodity being redirected by the diverter 216 as expected and the controller 214 may determine a blockage is present.

In box 610, the controller 214 may utilize the user interface 224 or the like to identify the presence of a blockage in the meter assembly 204. More specifically, the controller 214 may utilize a display or the like to show an icon identifying the presence and location of the commodity buildup. Alternatively, the user interface 224 may provide a different visual, auditory, or tactile indication that a commodity buildup has been identified.

In another aspect of this disclosure, the controller 214 may modify the agitator 206 as part of boxes 608 and 610. More specifically, in certain situations commodity may be present in the tank 202 but jammed or otherwise bridged before entering the meter assembly 204. In this configuration, even though commodity is in the tank 202 and the metering device 208 is engaged, commodity is not passing through the diverter 216 and the sensor 216 indicates no commodity contact in box 608. Accordingly, in one embodiment of this disclosure the controller 214 may first alter the agitator 206 when the sensor 216 does not identify commodity contact to ensure commodity is properly entering the meter assembly 204 from the tank 202. If commodity contact is still not identified after the agitator 206 is altered, the controller 214 may determine a buildup is present at the outlet 308.

While boxes 604 and 606 are illustrated and described as part of the logic control system 600, other embodiments may not consider boxes 604 and 606 at all. Rather, the controller 214 may directly consider whether the sensor 218 is identifying commodity contact in box 608. If the controller 214 is not identifying commodity contact in box 608 of this embodiment, the controller 214 may modify the agitator 206 to ensure any commodity in the tank 202 is entering the meter assembly 204 as discussed herein. If the sensor 218 continues to indicate there is no commodity flowing past the diverter 216, in box 610 the controller 214 may utilize the user interface 224 to indicate that either a blockage is present in the meter assembly 204 or there is no commodity in the tank 202.

The sensor 218 may communicate with the controller 214 utilizing any known communication protocol. While an electrical coupling via a wire 322 is discussed herein, other embodiments are also considered. More specifically, in another embodiment the sensor 218 may communicate with the controller 214 utilizing known wireless protocols. Accordingly, this disclosure contemplates utilizing many different communications protocols to communicate the readings of the sensor 218 to the controller 214.

The controller 214 may be any one or more controller of the seeder 20 or tractor 22 or otherwise. Accordingly, while a single controller 214 is illustrated, this disclosure considers implementing the teachings discuss herein with any one or more of the controllers of the seeder 20 or tractor 22. Further, in one aspect of this disclosure the controller 214 may have access to a memory unit for storing data and a processor for executing commands among other things. In one example, the logic control system 600 is stored on the memory unit. Further, the processor and memory unit may be part of the controller 214 or accessed separately or remotely. Accordingly, any known controller configuration may be utilized for implementing the teachings discussed herein.

The sensor 218 may be any type of sensor capable of identifying when commodity is bouncing off or otherwise moving by the diverter 216. In the non-exclusive example discussed herein, a piezoelectric sensor may be used. However, this disclosure considers implementing any type of sensor that can identify commodity passing by the diverter 216.

While the disclosure has been illustrated and described in detail in the drawings and foregoing description, such illustration and description is to be considered as exemplary and not restrictive in character, it being understood that illustrative embodiment(s) have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

The invention claimed is:

1. An air seeder assembly, comprising:
a tank for containing commodity;
a meter assembly coupled to the tank and configured to selectively distribute commodity there through;
a first conduit coupled to the meter assembly configured to direct commodity provided to the first conduit from the meter assembly to a tool assembly;
a diverter configured to selectively divert commodity to the first conduit; and
a sensor coupled to the diverter and configured to identify when commodity is passing thereby;
wherein the diverter comprises a flapper pivotable about a flapper axis and the sensor is positioned within the flapper.

2. The air seeder assembly of claim 1, further comprising a second conduit coupled to the meter assembly and configured to direct commodity provided to the second conduit from the meter assembly to the tool assembly.

3. The air seeder assembly of claim 2, further wherein the diverter has a first position that directs commodity towards the first conduit and a second position that directs commodity towards the second conduit.

4. The air seeder assembly of claim 1, further wherein the flapper comprises a non-planar surface profile on a first side and a second side.

5. The air seeder assembly of claim 1, further wherein the sensor is positioned inside a cavity of the diverter.

6. The air seeder assembly of claim 1, further wherein the sensor comprises at least one wire configured to communicate a sensor reading and the at least one wire exits the flapper along the flapper axis.

7. A meter assembly, comprising:
a housing defining an inlet configured to be coupled to a tank;
a metering device coupled to the housing and configured to meter flow of commodity from the inlet;
a diverter positioned at an outlet of the housing and configured to selectively distribute commodity to at least one conduit;
a sensor coupled to the diverter and configured to identify when commodity is flowing thereby;
wherein the sensor comprises a piezoelectric sensor configured to identify the impact of commodity against the diverter.

8. The meter assembly of claim 7, further wherein the diverter comprises a flapper pivotally coupled to the housing about a flapper axis and configured to be positionable between a first position and a second position.

9. The meter assembly of claim 8, further wherein the flapper is formed of a first side and a second side coupled to one another and the sensor is coupled between the first side and the second side.

10. The meter assembly of claim 8, further wherein the sensor has at least one wire configured to communicate a sensor reading and the at least one wire exits the flapper along the flapper axis.

11. The meter assembly of claim 8, further wherein the flapper has at least one non-planar surface profile configured to intermingle commodity that contacts the non-planar surface.

12. The meter assembly of claim 7, further comprising a second sensor coupled to the diverter.

13. The meter assembly of claim 12, further wherein the sensor is coupled to a first surface of the diverter and the second sensor is coupled to a second surface of the diverter, wherein the first surface is configured to be in a commodity flow path when the diverter is in a first position and the second surface is configured to be in the commodity flow path when the diverter is in a second position.

14. A method for identifying a blockage of commodity in a meter assembly, comprising:

providing a housing, a metering device, a diverter, at least one conduit, a sensor, and a controller;

coupling the metering device to the housing, the metering device configured to meter flow of commodity from an inlet to an outlet of the meter assembly;

positioning the diverter at the outlet of the meter assembly, the diverter configured to selectively distribute commodity to the at least one conduit; and coupling the sensor to the diverter, the sensor configured to communicate to the controller when commodity is flowing thereby and contacting the diverter.

15. The method of claim 14, further comprising identifying with the controller when a blockage occurs by monitoring when the metering device is moving commodity and the sensor is not identifying flowing commodity.

16. The method of claim 15, further comprising providing an indication when the controller identifies a blockage.

17. The method of claim 16, further wherein the indication comprises an icon displayed on a user interface.

* * * * *